United States Patent [19]

Uzawa et al.

[11] Patent Number: 4,459,488

[45] Date of Patent: Jul. 10, 1984

[54] PHOTOELECTRIC CONVERTING APPARATUS FOR DELIVERING A COMPENSATED SIGNAL

[75] Inventors: Shunichi Uzawa, Naka; Toshiyuki Komatsu, Yokohama; Seishiro Yoshioka, Tokyo; Masaki Fukaya, Kawasaki; Yoshiaki Shirato, Yokohama, all of Japan

[73] Assignee: Canon Kabushiki Kaisha, Tokyo, Japan

[21] Appl. No.: 296,258

[22] Filed: Aug. 26, 1981

[30] Foreign Application Priority Data

Sep. 10, 1980 [JP] Japan .............................. 55-125493

[51] Int. Cl.³ .............................................. H04N 5/30
[52] U.S. Cl. ..................................... 250/578; 357/32; 377/58; 136/293
[58] Field of Search ............... 250/211 R, 211 J, 209, 250/578, 214 C; 358/212, 213; 357/24 LR, 30-32; 374/126, 128, 133; 136/293; 377/58

[56] References Cited

U.S. PATENT DOCUMENTS

| | | | |
|---|---|---|---|
| 3,717,770 | 2/1973 | Dyck et al. | 250/211 J |
| 3,856,989 | 12/1974 | Weimer | 250/578 X |
| 4,300,163 | 11/1981 | Wada et al. | 358/213 X |
| 4,350,886 | 9/1982 | Pommerring | 250/578 X |

Primary Examiner—David C. Nelms
Assistant Examiner—Edward P. Westin
Attorney, Agent, or Firm—Fitzpatrick, Cella, Harper & Scinto

[57] ABSTRACT

A photoelectric converting apparatus having photoelectric converting elements divided into plural groups and a scanning circuit for dynamically scanning the photoelectric converting elements. There is also further provided a shielded element for each of the groups of the same characteristic as that of the photoelectric converting elements, and a circuit for supplying a bias voltage to the photoelectric converting elements and the shielded element in response to the output of the shielded element.

7 Claims, 1 Drawing Figure

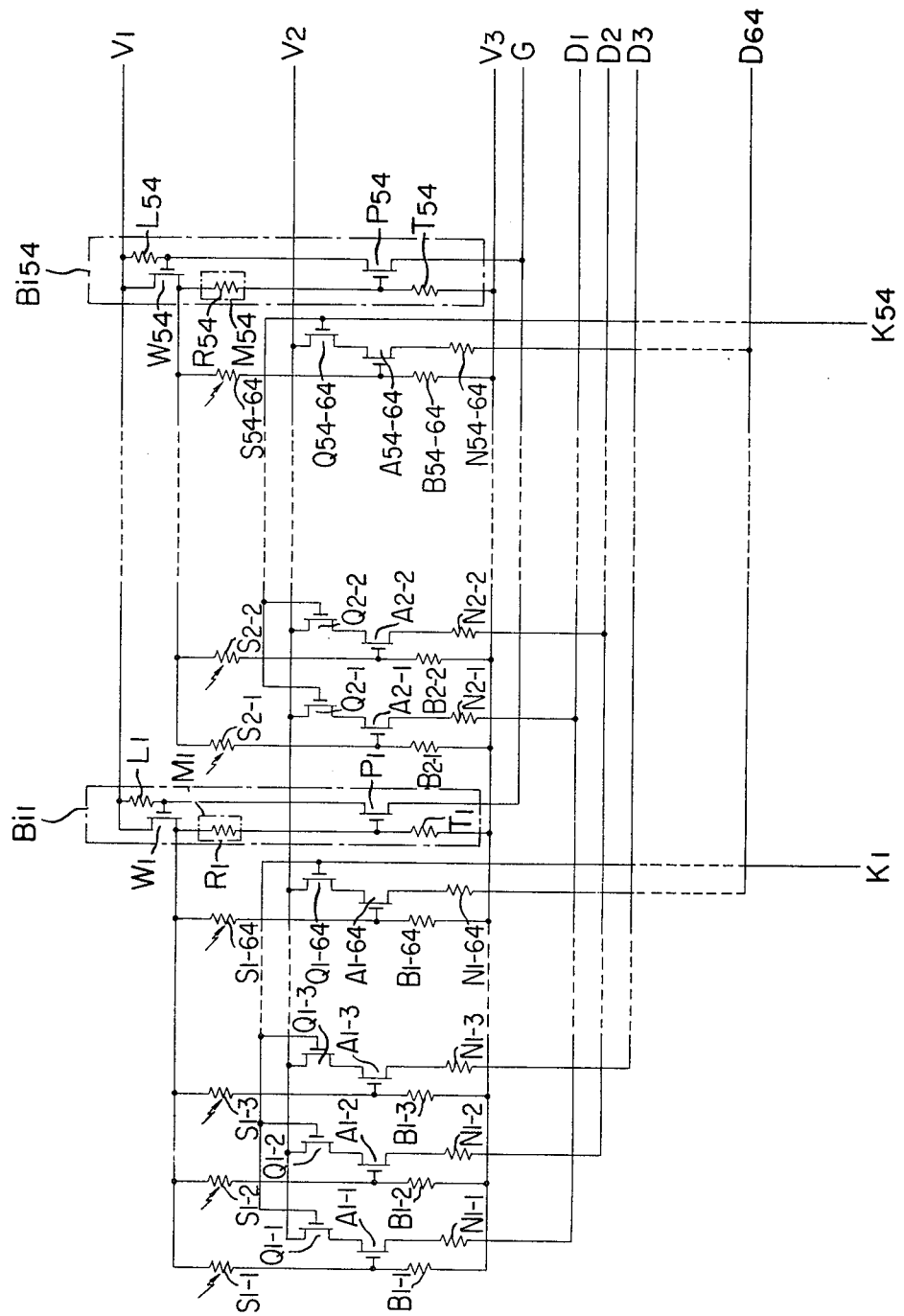

PHOTOELECTRIC CONVERTING APPARATUS FOR DELIVERING A COMPENSATED SIGNAL

BACKGROUND OF THE INVENTION

1. Field of the Invention

The present invention relates to a photoelectric converting apparatus for converting optical information into electric signals.

2. Description of the Prior Art

Certain photoelectric converting apparatus are provided with groups of converting elements having photoelectric converting performance and a scanning circuit for time-sequentially collecting electric signals from said groups. Such apparatus may be composed, for example, of combination of photodiodes and MOS field effect transistors (hereinafter called MOS type), or of a so-called charge transfer device (CTD) such as a charge-coupled device or a bucket brigade device.

However, in such a known device utilizing the MOS type technology or CTD technology, the light-receiving area in the photoelectric converting part is inevitably limited by the dimension of the single crystal silicon wafer used as the substrate. Since the present technology only obtains a single crystal silicon wafer of several inches in diameter at a maximum in consideration of the uniformity over the entire area, the light-receiving area of such known photoelectric converting apparatus utilizing the MOS type of CTD technology based on such a silicon wafer cannot exceed the above-mentioned dimension.

The photoelectric converting apparatus having a light-receiving area of such limited dimension requires, for example in the application as an input unit for a digital copying machine, the use of an optical system of a high reduction rate between an original to be copied and the light-receiving area for focusing the image of said original onto the light-receiving area.

In such a case the resolving power of the image is encountered by technical limitations as explained in the following.

As an example, in case of copying an original of A4 size with a photoelectric converting apparatus having a light-receiving area with a longitudinal length of 3 cm and with a resolving power of 10 lines/mm, the original image projected onto the light-receiving area is reduced to a size of about 1/69, so that the effective resolving power of the apparatus to said original drops to about 1.5 lines/mm. In this manner the effective resolving power is reduced in inverse proportion to the dimension of the original.

In order to overcome such a disadvantage in the above-mentioned converting apparatus, there is required a production technology for improving the resolving power in the photoelectric converting unit, but such technology also has a limitation since the required resolving power in a limited small area is only achievable with an extremely high degree of integration while avoiding defects in the component elements.

For this reason there is desired a photoelectric converting apparatus having a light-receiving area lengthened in size and improved in resolving power. Also there is proposed a photoelectric converting apparatus having photoelectric converting units on plural chips for projecting, dividedly, the image on said plural converting units, instead of utilizing a large single chip.

As explained in the foregoing because of the use of a large-sized wafer or plural chips, in such an apparatus the photoelectric converting elements formed on different parts of the wafer or on different chips tend to show mutually different characteristics to receive mutually different effects by the external perturbation, thus providing uneven output signals.

SUMMARY OF THE INVENTION

The object of the present invention is to provide a photoelectric converting apparatus capable of providing output signals of uniform electric characteristic from different photoelectric converting elements.

Another object of the present invention is to provide a photoelectric converting apparatus capable of providing output signals of uniform electric characteristic by the use of compensating elements which can be extremely easily prepared at the production of the apparatus.

Still another object of the present invention is to provide a photoelectric converting apparatus capable of providing output signals of uniform electric characteristic by means of compensating elements of a number less than that of the photoelectric converting elements.

Still another object of the present invention is to provide a photoelectric converting apparatus, making use of a fact that the photoelectric converting elements show uniform characteristics at least locally, provided with light-shielded elements having the same characteristics as that of the photoelectric converting elements thereby realizing a high resolving power for a light amount while assuring a high signal-to-noise ratio.

BRIEF DESCRIPTION OF THE DRAWING

The attached drawing is a circuit diagram of the photoelectric converting apparatus embodying the present invention.

DESCRIPTION OF THE PREFERRED EMBODIMENTS

Now the present invention will be described in detail by an embodiment thereof the circuit diagram of which is shown in the attached drawing, wherein 3456 photoelectric converting elements S1-1 to S54-64 are linearly arranged with a density of about 16 elements/mm to read a pixel line of the short edge (210 mm) of A4 size. Said photoelectric converting elements are divided into groups of 64 elements to provide the optical information entering consecutive 64 elements to signal lines $D1 \sim D64$ by means of scanning circuits composed of $\{(A1-1)-(A1-64)\} \sim \{(A54-1)-(A54-64)\}$, $\{(Q1-1)-(Q1-64)\} \sim \{(Q54-1)-(Q54-64)\}$, $\{(N1-1)-(N1-64)\} \sim \{(N54-1)-(N54-64)\}$. The optical information for example entering the first group of photoelectric converting elements $S1-1 \sim S1-64$ change the gate potentials of amplifying elements $A1-1 \sim A1-64$ whereby the channel resistances thereof vary corresponding to the amount of incident light. Upon supply of a potential to the selecting line K1, selecting elements $Q1-1 \sim Q1-64$ are rendered conductive to connect said amplifying elements $A1-1 \sim A1-64$ to a power source V2, thereby supplying signal lines $D1 \sim D64$ with signals corresponding to the channel resistances of the amplifying elements $A1-1 \sim A1-64$. After the photoelectrically converted output signals obtained on said signal lines $D1 \sim D64$ are recorded in the known manner or supplied to an unrepresented output element, a potential is given to a succeeding unrepresented selecting line K2 to obtain signals corresponding to another group of photoelectric converting elements S2-1~S2-64 on said signal lines D1~D64.

In this manner the output signals from the entire 54×64 converting elements S1-1-S1-64~S54-1-S54-64 can be obtained by successively activating the selecting lines up to K54.

Resistance elements N1-1~N1-64 are provided for giving current feedback to the amplifying elements A1-1~A1-64 to compensate the fluctuation in the transmission characteristics thereof. Compensating resistance elements B1-1~B54-64 are composed of substantially the same materials as those of the photoelectric converting elements and are so designed to provide appropriate biases to said amplifying elements in the absence of incident light. Also said compensating resistance elements function to compensate the temperature-dependent change in the sensor.

Bias voltage control circuits Bi1~Bi54, composed of resistors R1, L1, T1, transistors P1, W1, etc., are provided respectively corresponding to and in the vicinity of the groups of photoelectric converting elements for providing bias voltages to respective groups. R1 is a reference resistance element formed simultaneously with and in the vicinity of the photoelectric converting elements S1-1~S1-64 in such a manner as to have a characteristic similar to that of said converting elements, and is substantially completely shielded from light by a mask M1. Also T1 is a bias resistance element formed simultaneously with and in the vicinity of the compensating resistance elements B1-1~B1-64 in such a manner as to have a characteristic similar to that of said compensating elements. Consequently the resistance and temperature- or humidity-dependent behavior of the reference resistance element R1 or the bias resistance element T1 are quite similar to those of the photoelectric converting elements S1-1~S1-64 or the compensating resistance elements B1-1~B1-64, respectively. Transistor P1 is formed on the same chip as the amplifying elements A1-1~A1-64 to have the same characteristic as that of said amplifying elements, and provides a bias voltage through a drain load L1 and a source-follower transistor W1 to the photoelectric converting elements S1-1~S1-64 and the reference resistance element R1 in such a manner that said transistor P1 has a determined channel resistance. The presence of the bias voltage control circuit stabilized by the above-explained negative feed back function results in reduced deviation in the resistance of the photoelectric converting elements S1-1~S1-64, the compensating resistance elements B1-1~B1-64 and the threshold voltage of the amplifying elements A1-1~A1-64, among the deviations of various characteristics of the photoelectric converting elements S1-1~S1-64, thereby obtaining output signals corresponding to the received light.

More specifically, in contrast to a fluctuation range of about ±20% of the output signals from the elements S1-1~S54-64 in response to a fixed amount of incident light in the absence of said bias voltage control circuit, a plurality of said control circuits positioned locally reduces the fluctuation range of said output signals to about ±2%, thus drastically improving the accuracy of measurement of the amount of incident light.

The photoconductive elements employed in the foregoing embodiment can naturally be replaced by other suitable photoelectric converting elements. Also it will be evident that the control may be exerted locally on the bias source at the compensating resistance elements.

What we claim is:

1. Apparatus for converting optical information into electrical signals comprising:
   photoelectric converting means having a photoelectric converting element for converting a received light into an electric signal;
   power supply means for supplying said photoelectric converting means with power; and
   control means in a power supplying path from said power supply means to said photoelectric converting means for controlling the power to be supplied to said photoelectric converting means, said control means including an element shielded from the light, said element having the same electrical characteristics as said photoelectric converting element.

2. Apparatus according to claim 1, wherein said control means further includes a transistor in association with the shielded element and having impedance which is controlled by an output of said shielded element.

3. Apparatus according to claim 1, wherein said control means further includes a resistor connected in series to said shielded element, and a transistor connected at and controllable by a potential appearing at a junction of said shielded element and said resistor.

4. Apparatus for converting optical information into electrical signals comprising:
   a group of photoelectric converting elements each having one terminal connected in common with each other for converting a received light into an electric signal;
   power supply means for supplying said group of photoelectric converting elements with power;
   impedance changing means provided between said power supply means and the common connection;
   an element shielded from the light, disposed adjacent to said photoelectric converting elements and connected to said power supply means, said element having the same electrical characteristics as said photoelectric converting elements; and
   means for causing the output of said shielded element vary an impedance of said impedance changing means.

5. Apparatus according to claim 4, further comprising a plurality of groups of photoelectric converting elements.

6. Apparatus according to claim 5, further comprising selecting means for sequentially selecting said plurality of groups of photoelectric converting elements.

7. Apparatus for converting optical information into electrical signals comprising:
   a photoelectric converting element for converting a received light into an electric signal;
   an optically shielded element connected to said photoelectric converting element, said element having the same electrical characteristics as said photoelectric converting element;
   a first transistor connected to one terminal of said optically shielded element and controllable by an output of said shielded element; and
   a second transistor provided between power supply means and said photoelectric converting element, and adapted to be controlled by an output of said first transistor.

* * * * *